Nov. 12, 1968    P. RAINGER ETAL    3,411,096
ELECTRICAL STORAGE NETWORKS
Filed Aug. 12, 1964

INVENTORS:
PETER RAINGER
GEORGE ARTHUR HUNT

3,411,096
ELECTRICAL STORAGE NETWORKS
Peter Rainger, Pinner, and George Arthur Hunt, Old Coulsdon, England, assignors to The Marconi Company Limited and Standard Telephones & Cables Limited, both of London, England
Filed Aug. 12, 1964, Ser. No. 389,131
Claims priority, application Great Britain, Aug. 20, 1963, 32,952/63
9 Claims. (Cl. 328—151)

ABSTRACT OF THE DISCLOSURE

A circuit for storing and filtering a voltage waveform, using a resonant circuit fed with samples of the waveform at a frequency that is an integral or non-integral multiple of the resonance frequency of the resonance circuit and is related to the resonance frequency of the resonance circuit in dependence upon the performances required is disclosed by the hereinafter specification. The resonant circuit is terminated in an impedance higher than its characteristic impedance.

---

The present invention relates to electrical waveform storage networks.

It is one object of the invention to provide improved electrical storage networks having a pulse response of a known shape, for example, a raised cosine response, or sine squared response.

It is an advantage of the invention that the network is simple, consisting of few elements, and does not require to be terminated by a resistor, with consequent saving in the power consumed.

According to the present invention there is provided a four-terminal electrical storage network comprising a sampling switch, and a resonant circuit consisting of a first shunt capacitive arm connected through the sampling switch across input terminals, a series inductive arm, and a second shunt capacitive arm connected between output terminals, and means for operating the sampling switch to sample, at a frequency substantially equal to a multiple of the resonance frequency of the resonant circuit, an input voltage applied to the input terminals.

The inductive and capacitive arms of the resonant circuit, although being preponderantly inductive and capacitive respectively, may include, respectively, resistive and capacitive and resistive and inductive elements, according to the resonance characteristics required in the circuit. Any resistance across the output terminals is, however, arranged to be much greater than the characteristic impedance of the resonant circuit.

In addition to being dependent upon the resonance characteristics of the resonant circuit, the response of the storage network is dependent upon the relationship between the sampling frequency of the sampling switch and the resonance frequency of the resonant circuit. If the sampling frequency is equal to twice the resonance frequency of the resonant circuit, a sine squared response can be obtained. Alternatively the sampling frequency can be made equal to other integral multiples of the resonance frequency, or can be made equal to non-integral multiples thereof, such as 2½ times the resonance frequency. The relationship between the sampling frequency and resonance frequency may be stated as $$F_s = \frac{n}{m} F_r$$

where $F_s$ is the sampling frequency, $F_r$ is the resonance frequency of the resonant circuit and $n/m$ constitutes a multiplier that may be either an integral number or a non-integral number as aforestated.

Embodiments of the invention will now be described by way of example with reference to the accompanying drawing, in which.

Figure 1:
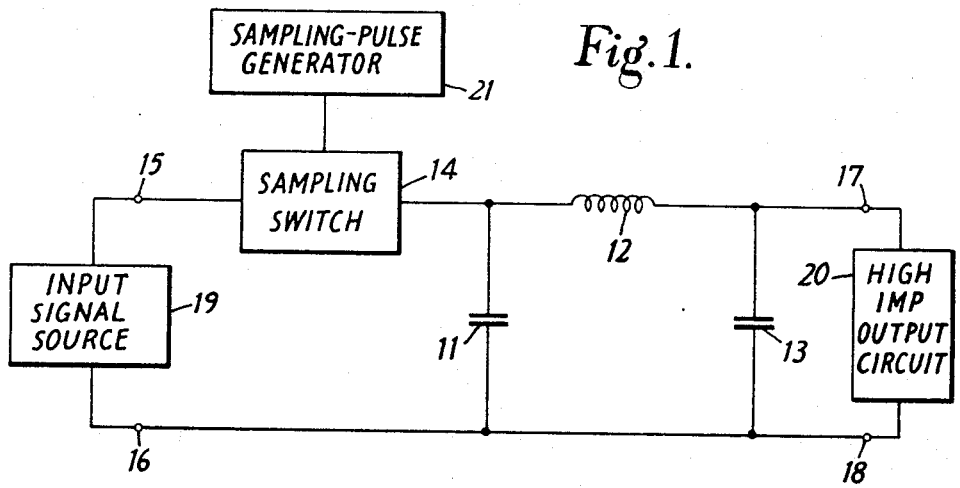
FIG. 1 shows a circuit diagram of one embodiment of the invention.
Figure 2A:
FIGS. 2a to 2d show various waveforms which illustrate the voltages applied to various parts of the circuit of FIG. 1.
Figure 2B:
Figure 2C:
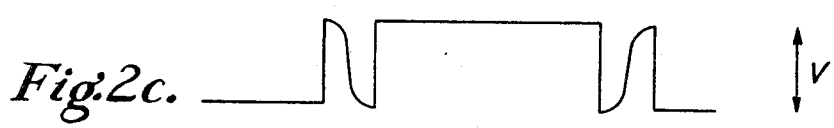
Figure 2D:

A four-terminal network with a cosine-squared response is provided. Referring to FIG. 1 a resonant circuit consists of a first capacitor 11 connected in parallel with a series combination of an inductor 12 and a second capacitor 13, the latter having the same capacitance as the first capacitor. A sampling switch 14 is connected between one input terminal 15 and the junction of the first capacitor 11 with the inductor 12. A sampling-pulse generator 21 is connected to the sampling switch 14. Another input terminal 16 is connected to the junction of the two capacitors 11 and 13. One output terminal 17 is connected to the junction of the second capacitor 13 with the inductor 12, and another output terminal 18 is connected to the junction of the two capacitors.

In operation an input signal, which consists of a varying voltage, is applied across the input terminals 15 and 16 from an input signal source 19. An output signal is taken from the output terminals 17 and 18 and fed to a high impedance circuit 20. The generator 21 feeds sampling pulses to the sampling switch 14 to sample the input signal at a frequency equal to twice the resonance frequency of the resonant circuit consisting of elements 11, 12 and 13. During the taking of each sample, the sampling switch 14 closes for an interval of time which is much shorter than the resonance period of the resonant circuit. While the sampling switch 14 is closed the input signal voltage is applied across the first capacitor 11.

An understanding of the manner of operation of the network is facilitated by consideration of FIG. 2 which illustrates the changes of voltage which occur across the various elements when the input signal consists of a stepped waveform. The input signal voltage across the input terminals 15 and 16 is shown at $a$ in FIG. 2 and is assumed to be initially zero, to rise in a sharp step to V volts, and then to return again to zero in a second sharp step. The sampling pulses fed by the generator 21 to the sampling switch 14 are shown at $b$ in FIG. 2. The voltages across the capacitors 11 and 13 are shown in FIG. 2 at $c$ and $d$ respectively. The voltage $d$ across the capacitor 13 is the output voltage.

When the sampling switch 14 closes initially, with the input voltage zero, no voltage is applied across the first capacitor 11, both capacitors 11 and 13 are uncharged and no voltage appears across the output terminals 17 and 18. The input signal voltage $a$ then rises to V volts. When the sampling switch 14 next closes, the voltage V is applied to the first capacitor 11 which charges to V volts as shown at $c$ in FIG. 2. The switch then opens, leaving the voltage $c$ across the first capacitor 11 instantaneously at V volts.

The first capacitor 11 discharges through the inductor 12 and charges the second capacitor 13 until, due to the action of the inductor 12, the voltage (shown at $d$) across the second capacitor 13 reaches V volts. At this time the voltage $c$ across the first capacitor 11 is zero, as the capacitor is completely discharged. At the instant when the voltage $d$ across the second capacitor reaches V the sampling switch 14 closes again and recharges the first capacitor 11. The network is now in a stable state and no current flows through the inductor 12.

The initial build-up of voltage across the second capacitor 13, and hence the output signal voltage $d$, is such as to give a sine-squared response to the network.

For this response, it is essential that the impedance of the load circuit 20 across the output terminals 17 and 18 be sufficiently high to prevent the second capacitor 13 from discharging appreciably between sampling pulses.

When the voltage $a$ applied across the input terminals 15 and 16 returns to zero, the voltage $c$ across the capacitor 11 remains at V volts until the next time the sampling switch 14 closes. When the switch 14 closes, the voltage $c$ across the capacitor 11 falls instantaneously to zero. During the next half-cycle of the resonance circuit the voltage $d$ across the capacitor 13 falls to zero gradually as the capacitor 13 discharges and the capacitor 11 recharges. By the time the switch 14 next closes, the voltage $c$ across the capacitor 11 is again at V volts while the voltage $d$ across the capacitor 13 has fallen to zero. When the switch 14 closes, the capacitor 11 discharges completely, whereupon both capacitors have zero voltage across them as shown at $c$ and $d$ respectively.

Figure 3:
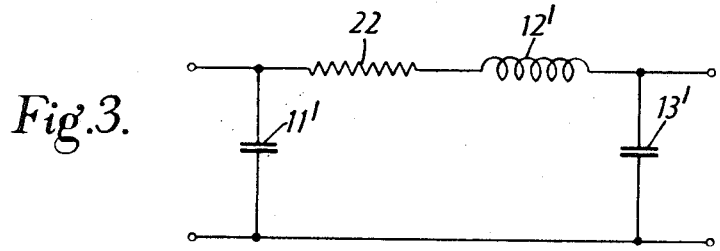
FIG. 3 shows a circuit diagram of a part of the circuit of FIG. 1 including a modification.

In an alternative embodiment, the two capacitors 11 and 13 and the inductor 12 may be replaced by two capacitive arms and an inductive arm respectively, the arms containing reactive and resistive elements other than the two capacitors and the inductor named in the embodiment described hereinbefore. Thus for example as shown in FIG. 3 the resonant circuit 11, 12, 13 of FIG. 1 may be replaced by a resonant circuit 11', 12', 13' with a resistor 22 connected, in this example, in series in the inductive arm. By varying the impedances in the different arms, different time responses can be obtained for the network.

It is not necessary that the capacitances of the two capactive arms should be equal. For example, if resistance is included in the inductive arm as shown in FIG. 3, the capacitance of the second capacitive arm 13' can be made less than that of the first 11'. In such a case the voltage across the first capacitive arm does not fall to zero at the end of the first half of the resonance period of the resonant circuit during which the second capacitor is being charged. If the capacitors are unequal in this way, the response of the filter is less sensitive to small changes in the rate of sampling.

It will be appreciated that embodiments of the invention can be constructed having pulse responses other than raised cosine or sine-squared responses. The frequency at which the sampling switch samples the input voltage need not be equal to twice the resonance frequency of the resonant circuit, but can be made equal to other integral or non-integral multiples of the resonant frequency.

Although networks embodying the invention are of wide application in general, they are particularly suitable for use as stores in the television standards converter described in our co-pending British patent specification No. 928,730.

We claim:
1. An electrical network comprising:
two input terminals;
two output terminals;
sampling switch means;
a resonant circuit, said resonant circuit comprising a first shunt capacitive arm, a series inductive arm, and a second shunt capacitive arm;
first connecting means connecting said first capacitive arm through said sampling switch means across said input terminals;
second connecting means connecting said second capacitive arm across said output terminals; and
means operating said sampling switch means to sample an input voltage applied across said input terminals, the frequency of said sampling switch-operating means being a multiple of $n/m$ times the resonance frequency of said resonant circuit, where $n$ and $m$ are different small integers.

2. A network according to claim 1, wherein the capacitances of said two capacitive arms are substantially the same.

3. A network according to claim 1, wherein said inductive arm consists of at least one inductor and said capacitive arms each consist of at least one capacitor.

4. A network according to claim 1, wherein the resonant circuit includes at least one resistive element.

5. A network according to claim 1, in which $n/m$ is substantially equal to two.

6. A network according to claim 1, including an output circuit connected across said output terminals, said output circuit having an impedance which is high compared with the characteristic impedance of the resonant circuit.

7. An electrical storage network comprising:
two input terminals;
two output terminals;
sampling switch means;
a resonant circuit, said resonant circuit comprising a first shunt capacitive arm, a series inductive arm, and a second shunt capacitive arm;
first connecting means connecting said first capacitive arm through said sampling switch means across said input terminals;
second connecting means connecting said second capacitive arm across said output terminals;
a sampling pulse generator for generating sampling pulses at a frequency substantially equal to $n/m$ times the resonance frequency of said resonant circuit, where $n$ and $m$ are different small integers; and
third connecting means for feeding said sampling pulses from said generator to said sampling switch means, each of said sampling pulses triggering said sampling switch means to sample an input voltage which, in operation, is applied across said input terminals.

8. An electrical storage network according to claim 7, including an output circuit connected across said output terminals, said output circuit having an impedance which is high compared with the characteristic impedance of the resonant circuit.

9. An electrical storage network according to claim 7, wherein said capacitive arms each consist of a capacitor and said inductive arm consists of an inductor.

References Cited

UNITED STATES PATENTS

| Re. 26,027 | 5/1966 | Manteuffel | 328—65 |
| 2,847,159 | 8/1958 | Curtis | 307—88.5 |

ARTHUR GAUSS, *Primary Examiner.*

J. ZAZWORSKY, *Assistant Examiner.*